(12) United States Patent
Burger, II et al.

(10) Patent No.: US 12,467,558 B1
(45) Date of Patent: Nov. 11, 2025

(54) ASSEMBLY TO FORM A SEAL ON A CONDUIT

(71) Applicant: The Boeing Company, Arlington, VA (US)

(72) Inventors: Eric Wayne Burger, II, Everett, WA (US); Korey James Harbke, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/659,209

(22) Filed: May 9, 2024

(51) Int. Cl.
| | |
|---|---|
| *F16L 5/02* | (2006.01) |
| *B29C 33/00* | (2006.01) |
| *B29C 33/20* | (2006.01) |
| *B29C 33/26* | (2006.01) |
| *B29C 33/30* | (2006.01) |
| *B29C 45/14* | (2006.01) |
| *B29C 65/70* | (2006.01) |
| *B29L 31/26* | (2006.01) |
| *F16L 55/175* | (2006.01) |
| *F16L 55/18* | (2006.01) |

(52) U.S. Cl.
CPC ............ *F16L 5/02* (2013.01); *B29C 33/0033* (2013.01); *B29C 33/202* (2013.01); *B29C 33/26* (2013.01); *B29C 33/30* (2013.01); *B29C 45/14598* (2013.01); *B29C 65/70* (2013.01); *F16L 55/175* (2013.01); *F16L 55/18* (2013.01); *B29L 2031/26* (2013.01)

(58) Field of Classification Search
CPC . F16L 5/10; F16L 55/175; F16L 55/18; B29L 2031/26–265; B29C 33/0033; B29C 33/0038–0044; B29C 33/005; B29C 33/202; B29C 33/22; B29C 33/26; B29C 45/14598; B29C 2045/14606; B29C 65/70
See application file for complete search history.

(56) References Cited

U.S. PATENT DOCUMENTS

| | | | |
|---|---|---|---|
| 5,196,210 A | 3/1993 | Yoshihara et al. | |
| 2010/0203187 A1* | 8/2010 | Schmid | B29C 49/5602 425/541 |
| 2010/0310803 A1 | 12/2010 | Wallace | |

(Continued)

FOREIGN PATENT DOCUMENTS

| | | | | |
|---|---|---|---|---|
| EP | 2976201 B1 | 5/2018 | | |
| GB | 2080476 A | * | 2/1982 | ............ F16L 55/175 |

OTHER PUBLICATIONS

EP Search Report mailed Sep. 16, 2025 in re EP Application No. 25172598.2.

*Primary Examiner* — Matthew P Travers
(74) *Attorney, Agent, or Firm* — COATS & BENNETT, PLLC (57) ABSTRACT

An assembly to form a seal around a conduit. The assembly includes a mold with multiple sections that mate together to form a cavity that extends around the conduit. A retaining plate is configured to mount to the conduit and positioned in contact with the mold. A knuckle has a clamshell configuration with a first jaw and a second jaw that are pivotally connected together by a connector and movable between an open position and a closed position. A spring clip is positioned between the knuckle and the retaining plate with the spring clip configured to apply a force to maintain the retaining plate in contact with the mold.

20 Claims, 8 Drawing Sheets

(56) References Cited

U.S. PATENT DOCUMENTS

2014/0261994 A1\* 9/2014 Coffland ........... B29C 45/14549
  425/500
2021/0356067 A1\* 11/2021 Irvin ....................... F16L 59/06

\* cited by examiner

ASSEMBLY TO FORM A SEAL ON A CONDUIT

TECHNOLOGICAL FIELD

The present disclosure relates generally to the field of sealing a conduit and, more specifically, to an assembly for forming a seal on a conduit.

BACKGROUND

It is often necessary to apply a sealant around the exterior of a conduit. For example, sealant is applied around a junction in a pipe to prevent liquid within the pipe from leaking. Another example includes applying a sealant to a tube that houses electrical wiring to prevent corrosion. Another example is applying a sealant to a conduit that extends through a wall to maintain a fire rating of the wall.

The process of applying a sealant is often performed manually by a technician. The process includes the technician initially accessing the conduit where the sealant is to be applied. This can include but is not limited to removing insulation or other material that is attached to the conduit, or removing nearby materials that are located in proximity to the conduit. Once accessed, the conduit is cleaned to enable the sealant to be secured to the conduit. The sealant is then applied to the conduit.

Often times the conduit is positioned at a location that is difficult to apply the sealant. For example, the conduit can extend through a wall or bulkhead. Further, the conduit can be located at a position where it is difficult for the technician to visually confirm that the sealant completely extends around and covers the conduit (e.g., completely extends around the exterior of joint). One specific example is to ensure that sealant has been applied completely around a pipe when the pipe is located within an opening in a bulkhead and the technician is not able to visually see one or more sections of the pipe.

Another issue is protecting the sealant after it has been applied to the conduit and while it is curing. After the sealant is applied, the technicians often are required to stay away from working in the area of the conduit to ensure that the sealant is not disturbed. For example, a technician may be required to apply a sealant to a conduit and then not perform any other work in the area during the curing period. This can be difficult when multiple different tasks are needed within an area, or if the conduit needs other work to be performed.

SUMMARY

One aspect is directed to an assembly to form a seal around a conduit. The assembly comprises a mold comprising multiple sections that mate together to form a cavity that extends around the conduit. A retaining plate is configured to mount to the conduit and positioned in contact with the mold. A knuckle comprising a clamshell configuration with a first jaw and a second jaw are pivotally connected together by a connector and movable between an open position and a closed position. A spring clip is positioned between the knuckle and the retaining plate with the spring clip configured to apply a force to maintain the retaining plate in contact with the mold.

In another aspect, each of the first jaw and the second jaw comprise an inner edge that align in the closed position to extend around the conduit.

In another aspect, a retaining clip is connected to one of the first jaw and the second jaw of the knuckle with the retaining clip shaped to engage with a mount on the other of the first jaw and the second jaw to secure the knuckle in the closed position.

In another aspect, the retaining plate comprises a first section with an outer perimeter, a lateral lip that extends axially from the outer perimeter, and wherein the lateral lip is configured to be positioned along a lateral side of the mold to maintain the multiple sections together.

In another aspect, the lateral lip comprises a tapered shape to force the sections of the mold together when the retaining plate is acted upon by the spring clip.

In another aspect, one or more openings extend through the mold and are in communication with the cavity with the one or more openings positioned along a lateral side of the mold.

In another aspect, the spring clip comprises an undulating shape with one or more curved sections that extend across a width.

One aspect is directed to an assembly to form a seal around a conduit. The assembly comprises a mold, a retaining plate, a spring clip, and a knuckle in a stacked configuration configured to be aligned axially along the conduit. The mold comprises multiple sections configured to be connected together to extend around the conduit. The retaining plate comprises a radial section and a lip that extends outward from an outer perimeter of the radial section with the lip configured to extend around a lateral side of the mold. The knuckle is configured to be moved between an open position with a central opening comprising an enlarged size to locate the knuckle at different axial positions along the conduit and a closed position with the central opening comprising a smaller size to lock the knuckle at one of the axial positions.

In another aspect, the multiple sections of the mold comprise a first half section and a second half section that are each configured to extend around a different angular section of the conduit.

In another aspect, each of the mold and the knuckle comprise central openings configured to receive the conduit and a body configured to extend completely around the conduit.

In another aspect, the knuckle comprises a first jaw and a second jaw each comprising an inner edge and a tip, a connector that pivotally connects the first jaw and the second jaw, and wherein in the open position tips of the first jaw and the second jaw are spaced apart to receive the conduit and in the closed position the tips of the first jaw and the second jaw are positioned together with the inner edges aligned in a central opening.

In another aspect, the retaining plate comprises a central receptacle with an open section such that the retaining plate extends around a limited angular section of the conduit.

In another aspect, the spring clip is positioned axially between the retaining plate and the knuckle with the spring clip configured to apply an axial force to the retaining plate.

In another aspect, the spring clip comprises one or more curves along a width.

One aspect is directed to a method of attaching an assembly to a conduit to form a seal around the conduit. The method comprises: positioning a mold around a conduit at a first axial position along the conduit; positioning a retaining plate on the conduit at a first axial side of the mold; attaching a knuckle to the conduit at a second axial position that is axially spaced along the conduit away from the first position and with the retaining plate positioned between the knuckle and the mold; compressing a spring clip that is positioned between the knuckle and the retaining plate and forcing the retaining plate against the first axial side of the mold; and while the spring clip is applying a force to the retaining plate, inserting a sealant into a cavity in the mold.

In another aspect, the method further comprises inserting the spring clip between the knuckle and the retaining plate after attaching the knuckle to the conduit.

In another aspect, positioning the mold around the conduit comprises positioning a first section of the mold along a first angular section of the conduit and positioning a second section of the mold along a second angular section of the conduit and abutting inner edges of the first section and the second section together and forming a joint.

In another aspect, the method further comprises contacting the retaining plate against lateral sides of the mold and pushing the first section and the second section together while the spring clip is applying the force to the retaining plate.

In another aspect, the method further comprises: positioning the knuckle in an open position with tips of a first jaw and a second jaw of the knuckle spaced apart; inserting the conduit between the first jaw and the second jaw; and moving the first jaw and the second jaw to a closed position that extends around the conduit and locking the first jaw and the second jaw in the closed position.

In another aspect, the method further comprises removing the mold, the retaining plate, the spring clip, and the knuckle from the conduit after the sealant is cured.

The features, functions and advantages that have been discussed can be achieved independently in various aspects or may be combined in yet other aspects, further details of which can be seen with reference to the following description and the drawings.

DETAILED DESCRIPTION

Figure 1:
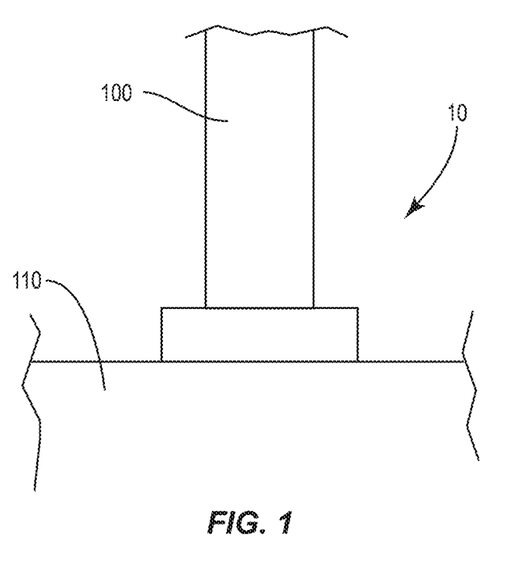
FIG. 1 is a side schematic view of an assembly connected to a conduit.
Figure 1A:
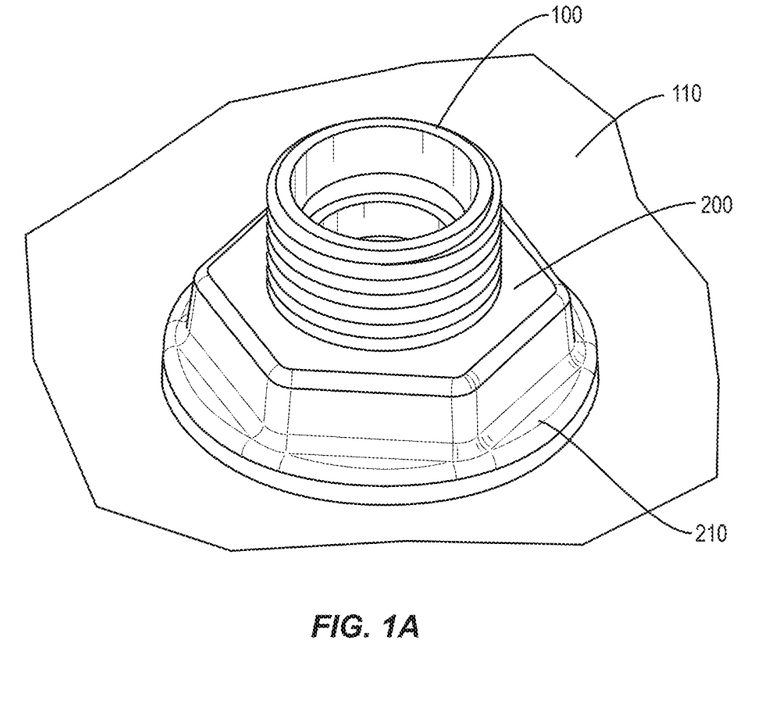
FIG. 1A is a perspective view of a seal formed on the conduit of FIG. 1.

FIG. 1 illustrates an assembly 10 connected to a conduit 100. The assembly 10 includes a mold with a cavity to receive sealant to form a seal on the exterior of the conduit 100. The assembly 10 is configured to remain attached to the conduit 100 while the sealant is curing to protect the sealant and enable the formation of the seal. FIG. 1A illustrates the seal 200 that is formed from the cured sealant 210 after removal of the assembly 10. In some examples, the assembly 10 is mounted to the conduit 100 adjacent to a structural member 110 such as a wall or bulkhead.

Figure 2:
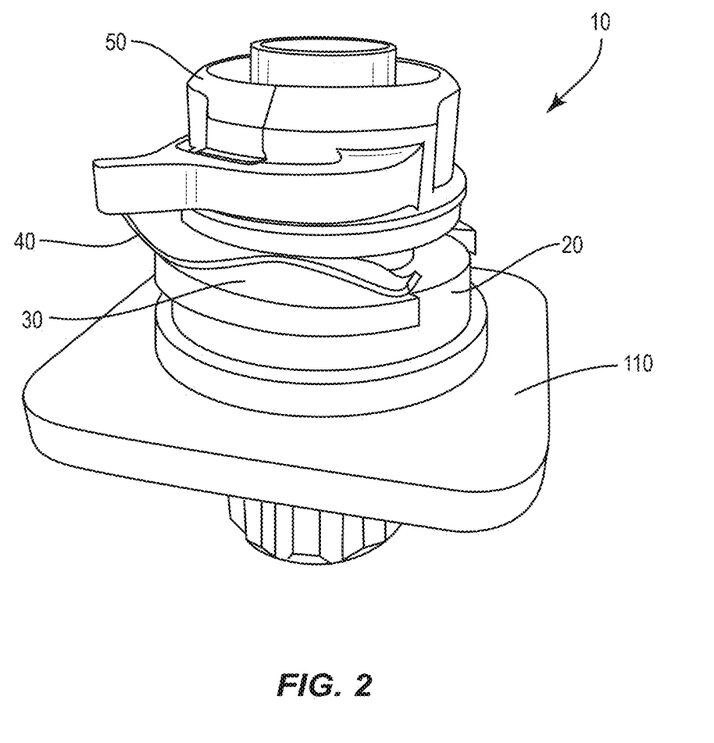
FIG. 2 is an isometric view of an assembly connected to a conduit.

FIG. 2 illustrates an assembly 10 connected to a conduit 100. The assembly 10 is in a stacked arrangement that extends axially along the conduit 100. The assembly 10 includes a mold 20 that receives the sealant to form the seal. A retaining plate 30 contacts against the side of the mold 20. A knuckle 50 is configured to connect to the conduit 100. A spring clip 40 is positioned between the knuckle 50 and the retaining plate 30 to apply a force to the retaining plate 30. The force on the retaining plate 30 is transferred to the mold 20 to maintain the position of the mold 20 on the conduit 100.

Figure 3:
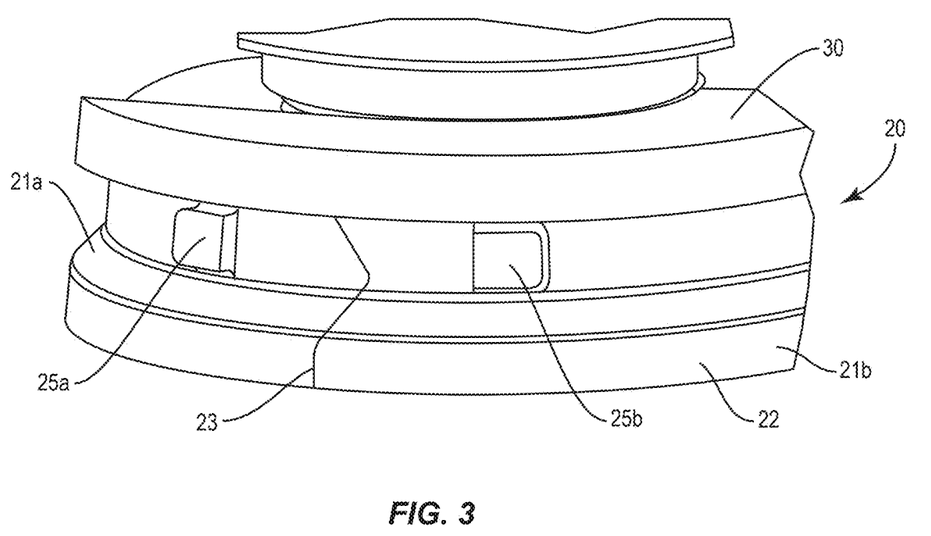
FIG. 3 is an isometric view of a retaining plate positioned along one side of a mold.
Figure 4:
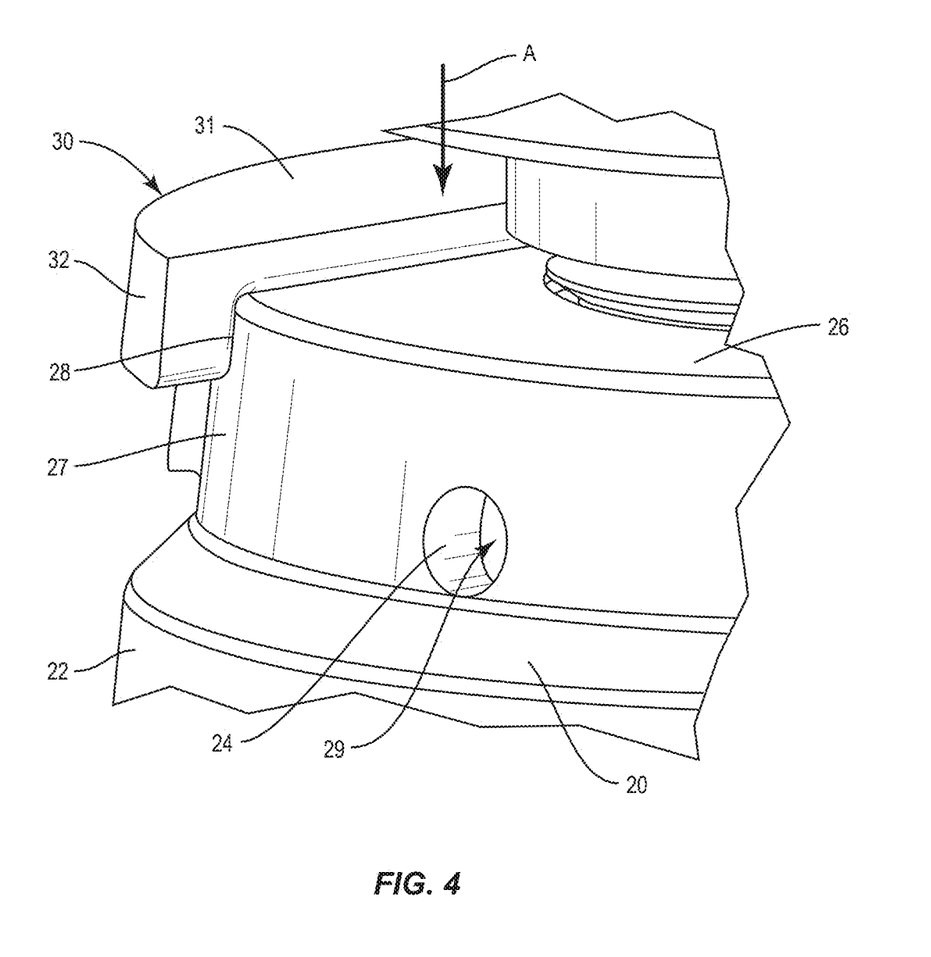
FIG. 4 is an isometric view of a retaining plate positioned along one side of a mold.
Figure 5:
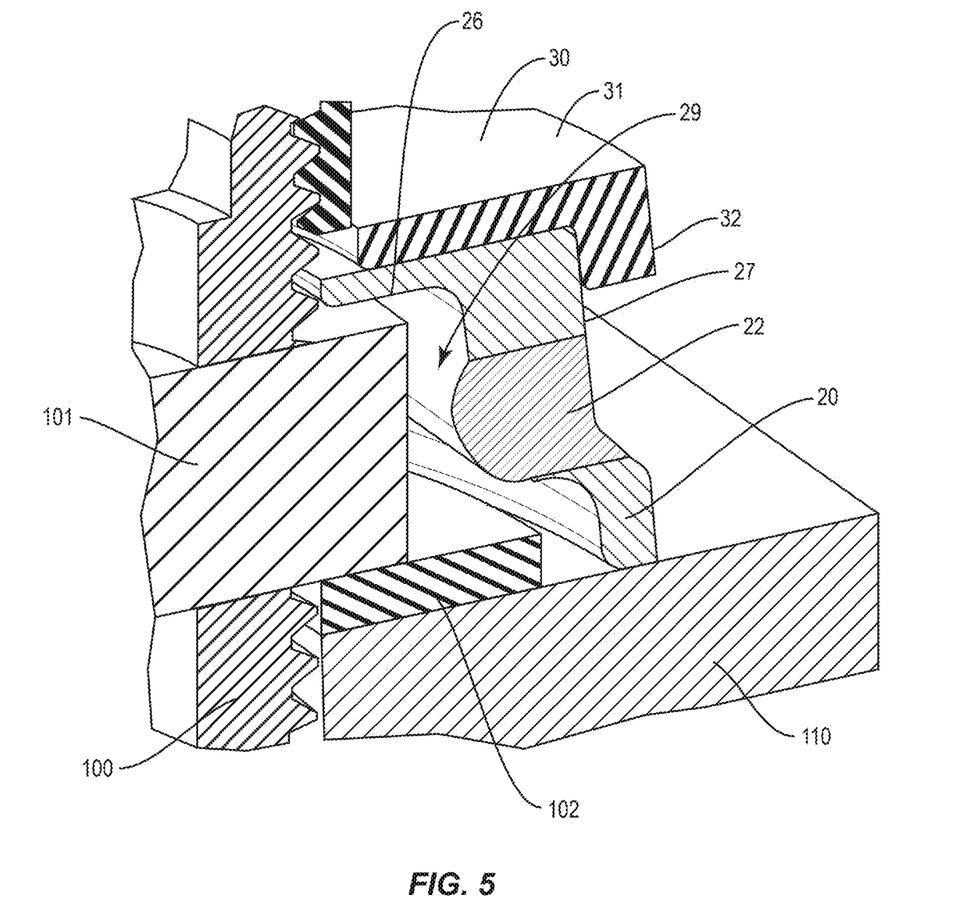
FIG. 5 is a partial section view of a cavity formed within an interior of a mold.

The mold 20 is configured to receive the sealant 210 in a liquid form and form the seal 200. As illustrated in FIGS. 3, 4, and 5, the mold 20 includes a body 22 with an interior cavity 29 that receives the sealant 210. The body 22 and the cavity 29 can include various shapes and sizes. In some examples, the mold 20 has a central opening that receives the conduit 100 with the cavity 29 extending around the central opening. The cavity 29 is open along the central opening for the seal 200 to attach to the conduit 100. In some examples, a bottom side of the cavity 29 is also open for the seal 200 to attach to the structural member 110. In other examples, the bottom side is enclosed by the body 22.

The mold 20 includes two or more sections 21 that mate together to form the cavity 29. In some examples as illustrated in FIG. 3, mold 20 is formed by two sections 21a, 21b that each extend around substantially one half of the angular space around the conduit 100. The sections 21 include inner edges that abut together and form a joint 23. The sectional construction enables the mold 20 to extend around the conduit 100 and form a continuous cavity 29.

The mold 20 is configured to receive the sealant 210 that is in a liquid form. One or more openings 24 extend through the mold 20 and into the cavity 29. The openings 24 provide for inserting the sealant into the cavity 29 when the mold 20 is mounted on the conduit 100. In one example as illustrated in FIG. 4, the mold 20 includes a top side 26 and a lateral side 27. The openings 24 are positioned on the lateral side 27. This positioning provides for the openings 24 to be accessible when the retaining plate 30 contacts against the top side 26 of the mold 20. In one example, at least one opening 24 is positioned on each of the sections. This provides for the openings 24 to be spaced apart around the cavity 29 to enable the sealant 210 to flow throughout the cavity 29 prior to curing.

As illustrated in FIG. 3, the mold 20 includes one or more leverage points 25. The leverage points 25 extend radially outward from the lateral side 27. The leverage points 25 form mounts to apply a force to seal the sections 21 when mounting the mold 20 to the conduit 100 and/or to separate the sections during removal of the mold 20 from the conduit 100. Additionally or alternatively, the leverage points 25 provide for handling the mold 20. In some examples, at least one leverage point 25 is positioned on each of the sections 21. In the specific example of FIG. 3, section 21a includes a leverage point 25a and section 21b includes leverage point 25b. In one example, the leverage points 25 of the different sections are in proximity to the joint 23.

The retaining plate 30 is positioned axially along the assembly 10 at a point to contact against the mold 20. The retaining plate 30 can be constructed from one or more sections. In some examples, the retaining plate 30 is constructed from multiple sections that combine together to form an annular shape that extends completely around the perimeter of the conduit 100. In other examples, the retaining plate 30 has an open side that enables the retaining plate 30 to be inserted onto the conduit 100. In these examples, the retaining plate 30 extends around a limited section of the perimeter of the conduit 100.

As illustrated in FIG. 4, the retaining plate 30 includes a top section 31 and a lip 32. The top section 31 is sized to extend over and contact against the top side 26 of the mold 20. The lip 32 extends downward around the lateral side 27 of the mold 20. The lip 32 includes a tapered interior edge 28 configured to push the sections 21, 22 of the mold 20 together when a force is applied on the retaining plate 30 from the top (i.e., in the direction of arrow A in FIG. 4).

FIG. 5 illustrates the retaining plate 30 contacting against the mold 20. Specifically, the top section 31 contacts against the top side 26 of the mold 20 and the lip 32 contacts against the lateral side 27. The cavity 29 within the mold 20 extends around and contacts against the conduit 100.

Figure 6:
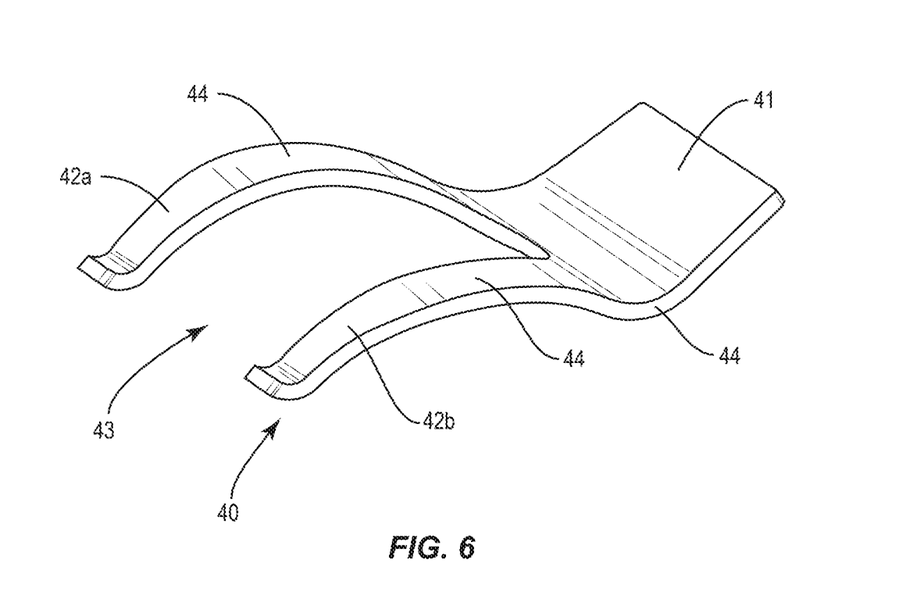
FIG. 6 is an isometric view of a spring clip.

The spring clip 40 is positioned axially along the assembly 10 between the retaining plate 30 and the knuckle 50. The spring clip 40 contacts against the top section 31 of the retaining plate 30 and applies the force to the retaining plate 30. As illustrated in FIG. 6, the spring clip 40 includes a base 41. Fingers 42 extend outward from the base 41 and are spaced apart by a gap 43. When mounted to the conduit 100, the fingers 42a, 42b are positioned on opposing sides with the conduit 100 positioned in the gap 43. The base 41 is positioned on one side of the conduit 100 and provides a handle for placement of the spring clip 40.

The spring clip 40 has an undulating shape with one or more curves 44 that extend along the width. FIG. 6 illustrates an example with a first curve along the fingers 42 and a second curve along the base 41. Other examples include a single curve, and three or more curves. During use, the spring clip 40 is compressed between the retaining plate 30 and the knuckle 50. The curves 44 are flattened causing the spring clip 40 to apply the force to the retaining plate 30. The spring clip 40 can be constructed from a variety of materials including but not limited to various metals, plastics, and polymers. In one example, the spring clip 40 is constructed from carbon fiber reinforced polycarbonate (PC-CF). The PC-CF material results in the spring clip 40 not taking a set when compressed within the assembly 10 which enables long term use. Further, the PC-CF material does not marr the other components of the assembly 10 or the conduit 100. The PC-CF also enables 3D printing of the spring clip 40.

Figure 7:
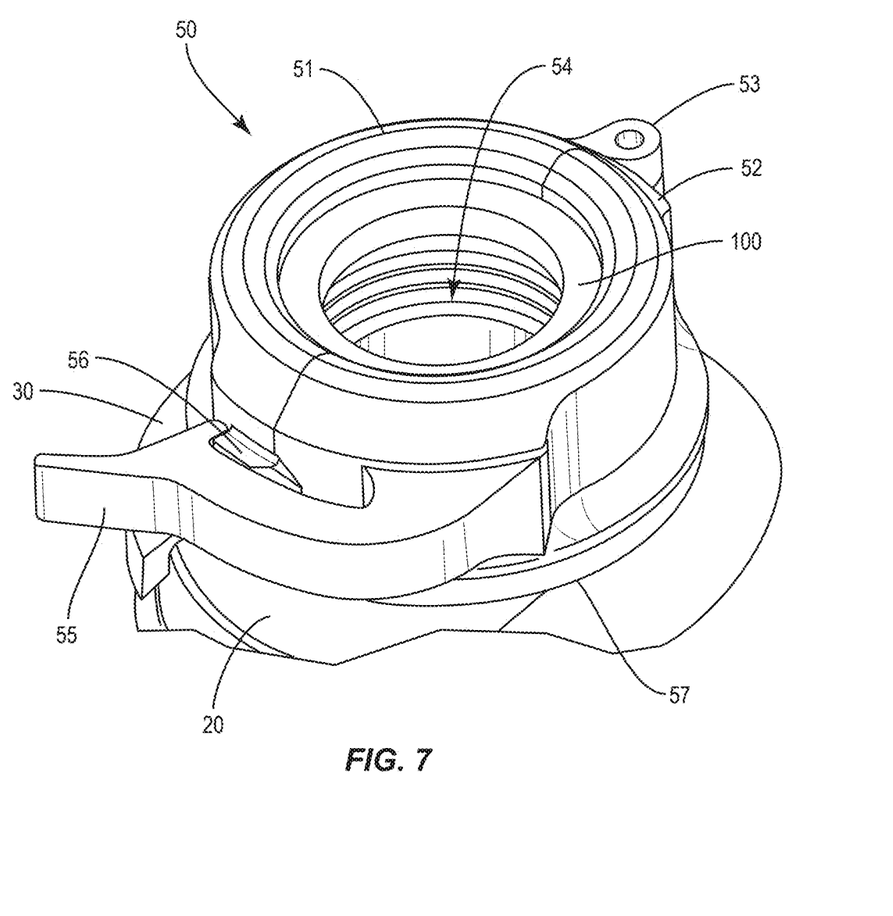
FIG. 7 is an isometric view of a knuckle attached to a conduit.

The knuckle 50 is positioned axially along the assembly 10 adjacent to the spring clip 40 and on an opposing side from the retaining plate 30. The knuckle 50 has a clamshell configuration featuring a first jaw 51 and a second jaw 52 that are pivotally connected together at a connector 53. As illustrated in FIG. 7, each of the first jaw 51 and second jaw 52 have a curved shape that mate together to form an annular shape in the closed position. The jaws 51, 52 extend around and form a central opening 54 sized to receive the conduit 100. In one example, the central opening 54 has a circular shape that matches the shape of the conduit 100. In some examples, the inner edges of the jaws 51, 52 can be substantially smooth or can be threaded to engage with threads on the conduit 100. A retaining clip 55 that extends from one of the jaws 51, 52 engages with a mount 56 on the other section. In the closed position as illustrated in FIG. 7, the retaining clip 55 engages with the mount 56 to lock the knuckle 50.

To connect the knuckle 50 to the conduit 100, the first jaw 51 and second jaw 52 are pivoted apart to an open position. The open position includes the ends of the jaws 51, 52 spaced apart. The knuckle 50 is moved around the conduit 100 with the conduit 100 positioned in the opening 54. The first jaw 51 and second jaw 52 are then pivoted about the connector 53 to the closed position to close the opening 54. The retaining clip 55 is then engaged with the mount 56 to secure the knuckle 50 to the conduit 100.

In use, the mold 20 is positioned around the conduit 100. The retaining plate 30 is positioned along the conduit 100 on the top side 26 of the mold 20. Further, the knuckle 50 is attached to the conduit 100 adjacent to the retaining plate 30. The spring clip 40 is positioned between the retaining plate 30 and knuckle 50. The spring clip 40 is biased to apply a force to the retaining plate 30. This force is transferred to the mold 20 to hold the sections 21 of the mold together around the conduit 100. Liquid sealant 210 is inserted into the interior cavity 29 of the mold 20. In some examples, the sealant 210 completely fills the cavity 29, with other examples including insertion of a lesser amount of sealant 210. The assembly 10 remains attached to the conduit 100 during the curing of the sealant 210. The curing process can vary in time depending upon the type of sealant and environment. After the sealant has cured, the knuckle 50 is released from the conduit 100. The spring clip 40 and retaining plate 30 are then also removed from the conduit 100. The mold 20 is removed with the resultant seal 200 formed by the cured sealant 210 remaining on the conduit 100.

The various steps of the process can occur in various sequences. In some examples, the spring clip 40 is positioned at the retaining plate 30, and then the knuckle 50 is axially moved along the conduit 100 into contact with the spring clip 40 and then secured in position. In some examples, during removal of the assembly 10 the spring slip 40 is pulled by the base 41 by a technician prior to removal of the knuckle 50 and mold 20.

Figure 8:
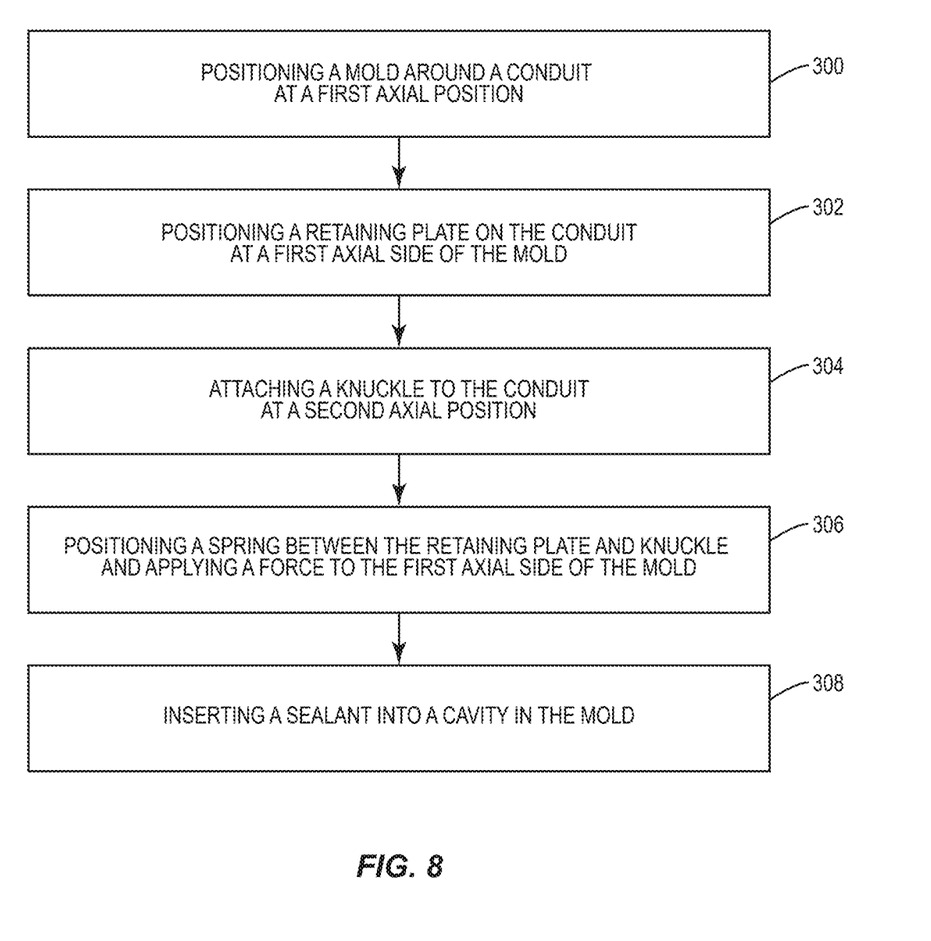
FIG. 8 is a flowchart diagram of a method of attaching an assembly to a conduit to form a seal around the conduit.

FIG. 8 illustrates a method of attaching an assembly 10 to a conduit 100 to form a seal 200 around the conduit 100. A mold 20 is positioned around the conduit 100 at a first axial position (block 300). A retaining plate 30 is positioned on the conduit 100 at a first axial side of the mold 20 (block 302). A knuckle 50 is attached to the conduit 100 at a second axial position that is axially spaced along the conduit 100 away from the first position and with the retaining plate 30 positioned between the knuckle 50 and the mold 20 (block 304). A spring clip 40 positioned between the retaining plate 30 and knuckle 50 is compressed forcing the retaining plate 30 against the first axial side of the mold 20 (block 306). While the spring clip 40 is applying a force to the retaining plate 30, a sealant 210 is inserted into a cavity 29 in the mold 20 (block 308).

In some examples, the seal 200 is formed along the conduit 100 adjacent to a structural member 110. Structural members 110 can include but are not limited to walls, bulkheads, ceilings, and floors. In other examples, the seal 200 is positioned along the conduit 100 away from any structural members 110.

The conduit 100 can include various configurations and have various shapes and sizes. Examples on conduits 100 include but are not limited to pipes that contain a fluid, and sheathing for electrical wiring and/or optical fiber. In the example of FIG. 5, the conduit 100 includes a pipe with a nut 101 and a washer 102.

In some examples, the seal 200 included rounded or filleted edges to prevent external liquid/moisture from collecting or pooling by providing a smooth flow path for drainage.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly to form a seal around a conduit, the assembly comprising:
   a mold comprising multiple sections that mate together to form a cavity that extends around the conduit;
   a retaining plate configured to mount to the conduit and positioned in contact with the mold;
   a knuckle comprising a clamshell configuration with a first jaw and a second jaw that are pivotally connected together by a connector and movable between an open position and a closed position; and
   a spring clip positioned between the knuckle and the retaining plate, the spring clip configured to apply a force to maintain the retaining plate in contact with the mold.

2. The assembly of claim 1, wherein each of the first jaw and the second jaw comprise an inner edge that align in the closed position to extend around the conduit.

3. The assembly of claim 2, further comprising a retaining clip connected to one of the first jaw and the second jaw of the knuckle, the retaining clip shaped to engage with a mount on the other of the first jaw and the second jaw to secure the knuckle in the closed position.

4. The assembly of claim 1, wherein the retaining plate comprises:
   a first section with an outer perimeter;
   a lateral lip that extends axially from the outer perimeter; and
   wherein the lateral lip is configured to be positioned along a lateral side of the mold to maintain the multiple sections together.

5. The assembly of claim 4, wherein the lateral lip comprises a tapered shape to force the sections of the mold together when the retaining plate is acted upon by the spring clip.

6. The assembly of claim 1, further comprising one or more openings that extend through the mold and are in communication with the cavity, the one or more openings positioned along a lateral side of the mold.

7. The assembly of claim 1, wherein the spring clip comprises an undulating shape with one or more curved sections that extend across a width.

8. An assembly to form a seal around a conduit, the assembly comprising:
   a mold, a retaining plate, a spring clip, and a knuckle in a stacked configuration configured to be aligned axially along the conduit;
   wherein the mold comprises multiple sections configured to be connected together to extend around the conduit;
   wherein the retaining plate comprises a radial section and a lip that extends outward from an outer perimeter of the radial section, the lip configured to extend around a lateral side of the mold; and
   wherein the knuckle is configured to be moved between an open position with a central opening comprising an enlarged size to locate the knuckle at different axial positions along the conduit and a closed position with the central opening comprising a smaller size to lock the knuckle at one of the axial positions.

9. The assembly of claim 8, wherein the multiple sections of the mold comprise a first half section and a second half section that are each configured to extend around a different angular section of the conduit.

10. The assembly of claim 8, wherein each of the mold and the knuckle comprise central openings configured to receive the conduit and a body configured to extend completely around the conduit.

11. The assembly of claim 8, wherein the knuckle comprises:
    a first jaw and a second jaw each comprising an inner edge and a tip;
    a connector that pivotally connects the first jaw and the second jaw;
    wherein in the open position, tips of the first jaw and the second jaw are spaced apart to receive the conduit and in the closed position the tips of the first jaw and the second jaw are positioned together with the inner edges aligned in the central opening.

12. The assembly of claim 8, wherein the retaining plate comprises a central receptacle with an open section such that the retaining plate extends around a limited angular section of the conduit.

13. The assembly of claim 8, wherein the spring clip is positioned axially between the retaining plate and the knuckle, the spring clip configured to apply an axial force to the retaining plate.

14. The assembly of claim 13, wherein the spring clip comprises one or more curves along a width.

15. A method of attaching the assembly of claim 1 to a conduit to form a seal around the conduit, the method comprising:
    positioning the mold around a conduit at a first axial position along the conduit;
    positioning the retaining plate on the conduit at a first axial side of the mold;
    attaching the knuckle to the conduit at a second axial position that is axially spaced along the conduit away from the first position and with the retaining plate positioned between the knuckle and the mold;
    compressing the spring clip that is positioned between the knuckle and the retaining plate and forcing the retaining plate against the first axial side of the mold; and
    while the spring clip is applying a force to the retaining plate, inserting a sealant into the cavity in the mold.

16. The method of claim 15, further comprising inserting the spring clip between the knuckle and the retaining plate after attaching the knuckle to the conduit.

17. The method of claim 15, wherein positioning the mold around the conduit comprises positioning a first section of the mold along a first angular section of the conduit and positioning a second section of the mold along a second angular section of the conduit and abutting inner edges of the first section and the second section together and forming a joint.

18. The method of claim 17, further comprising contacting the retaining plate against lateral sides of the mold and pushing the first section and the second section together while the spring clip is applying the force to the retaining plate.

19. The method of claim 15, further comprising:
    positioning the knuckle in the open position with tips of the first jaw and the second jaw of the knuckle spaced apart;

inserting the conduit between the first jaw and the second jaw; and moving the first jaw and the second jaw to the closed position that extends around the conduit and locking the first jaw and the second jaw in the closed position.

20. The method of claim 15, further comprising removing the mold, the retaining plate, the spring clip, and the knuckle from the conduit after the sealant is cured.

\* \* \* \* \*